United States Patent
Lienau et al.

(10) Patent No.: US 7,988,411 B2
(45) Date of Patent: Aug. 2, 2011

(54) FLOW MACHINE FOR A FLUID WITH A RADIAL SEALING GAP

(75) Inventors: Wolfram Lienau, Haeuslenen (CH); Paul Meuter, Seuzach (CH)

(73) Assignee: Sulzer Pumpen AG, Winterthur (CH)

(*) Notice: Subject to any disclaimer, the term of this patent is extended or adjusted under 35 U.S.C. 154(b) by 982 days.

(21) Appl. No.: 11/649,937

(22) Filed: Jan. 5, 2007

(65) Prior Publication Data

US 2007/0160467 A1    Jul. 12, 2007

(30) Foreign Application Priority Data

Jan. 12, 2006    (EP) .................................. 06405010

(51) Int. Cl.
*F01D 11/00*    (2006.01)

(52) U.S. Cl. ..................... 415/174.4; 415/196

(58) Field of Classification Search ............... 415/170.1, 415/173.1, 173.4, 173.6, 174.4, 196, 205, 415/230; 416/186 R; 277/411, 412, 413, 277/400, 404, 422

See application file for complete search history.

(56) References Cited

U.S. PATENT DOCUMENTS

| | | | | |
|---|---|---|---|---|
| 2,210,723 A * | 8/1940 | Kosatka | ........................ | 277/571 |
| 2,253,904 A * | 8/1941 | Haug | ............................ | 277/553 |
| 2,684,033 A * | 7/1954 | Montgomery et al. | ........ | 415/113 |
| 2,851,289 A * | 9/1958 | Pedersen | ........................ | 277/415 |
| 2,927,724 A * | 3/1960 | Wardle | .......................... | 415/113 |
| 3,228,342 A * | 1/1966 | Page | ............................. | 415/113 |
| 3,325,172 A * | 6/1967 | Herbold | ........................ | 277/411 |
| 3,460,843 A * | 8/1969 | Jaeger | ............................ | 277/411 |
| 3,743,008 A * | 7/1973 | Zeek et al. | ....................... | 165/9 |
| 3,825,364 A * | 7/1974 | Halila et al. | ................... | 415/116 |
| 3,897,956 A * | 8/1975 | Kurio et al. | ..................... | 277/357 |
| 4,185,838 A * | 1/1980 | Danner | ......................... | 277/562 |
| 4,470,605 A * | 9/1984 | Deuring | ........................ | 277/309 |
| 4,718,820 A * | 1/1988 | Jaques | .......................... | 415/230 |
| 4,909,706 A * | 3/1990 | Bergsten et al. | .......... | 415/172.1 |
| 4,948,336 A * | 8/1990 | Mosure | ....................... | 415/172.1 |

(Continued)

FOREIGN PATENT DOCUMENTS

GB    2315824 A    2/1998

(Continued)

OTHER PUBLICATIONS

MPIF (Metal Powder Industries Federation) Standard 35, ISBN No. 1-878954-77-6, © 2000.*

*Primary Examiner* — Justine R Yu
*Assistant Examiner* — Aaron R Eastman
(74) *Attorney, Agent, or Firm* — Kilpatrick Townsend & Stockton LLP

(57) ABSTRACT

A flow machine for a fluid is presented with a radial sealing gap (9) between stator parts (4) and a rotor (3), wherein at least one wear ring (5) is provided at the sealing gap and is fastened to a stator part (4) via an elastically deformable fastening part. The fastening part (6) is connected on the one side to the stator part (4). On this side a radial gap (8) is formed between an outer jacket surface of the wear ring and the fastening part and, on the other side, with the wear ring. On this side a radial gap (7) is formed between an outer jacket surface of the fastening part and the stator part.

8 Claims, 3 Drawing Sheets

U.S. PATENT DOCUMENTS

| | | | | |
|---|---|---|---|---|
| 5,100,158 | A | * | 3/1992 | Gardner .................. 277/411 |
| 5,106,262 | A | * | 4/1992 | Oklejas et al. ............. 415/171.1 |
| 5,169,286 | A | * | 12/1992 | Yamada ..................... 415/48 |
| 5,295,786 | A | * | 3/1994 | Kajiwara .................. 415/172.1 |
| 5,622,473 | A | * | 4/1997 | Payling ..................... 415/160 |
| 5,743,707 | A | * | 4/1998 | Battig et al. ................ 415/113 |
| 5,795,129 | A | * | 8/1998 | Urban et al. .............. 415/170.1 |
| 5,807,072 | A | * | 9/1998 | Payling ................... 415/170.1 |
| 6,139,261 | A | * | 10/2000 | Bishop et al. ............... 415/148 |
| 6,234,489 | B1 | * | 5/2001 | Orlowski et al. ............. 277/395 |
| 6,659,716 | B1 | * | 12/2003 | Laurello et al. .............. 415/116 |
| 6,733,234 | B2 | * | 5/2004 | Paprotna et al. ............. 415/138 |
| 7,140,836 | B2 | * | 11/2006 | Balsdon ..................... 415/116 |
| 2006/0251511 | A1 | * | 11/2006 | Rosenkranz ............... 415/170.1 |

FOREIGN PATENT DOCUMENTS

JP        55164797 A   * 12/1980

* cited by examiner

FLOW MACHINE FOR A FLUID WITH A RADIAL SEALING GAP

CROSS-REFERENCES TO RELATED APPLICATIONS

This application claims the priority of European patent application No. 06405010.7, dated Jan. 12, 2006, the disclosure of which is incorporated herein by reference.

BACKGROUND OF THE INVENTION

The invention relates to a flow machine for a fluid.

Radial sealing gaps are often provided in flow machines between the rotor and the stator parts, which are normally narrowly designed in order to keep the flow losses small. If the rotor part and the stator part touch in certain operating conditions, such as on starting up of the flow machine, this can lead to wear of the stator parts and/or of the rotor and to an undesired widening of the sealing gap. If the fluid contains solid materials, this can likewise lead to wear in the narrow sealing gaps.

In order to counteract an undesired widening of the sealing gap, protective layers and/or self-supporting wear rings of wear-resistant materials are used for this reason in the sealing gaps. Wear rings of this kind do have high resistance to wear, however they can only be manufactured in simple forms due to their resistance to wear. A further disadvantage is the small thermal expansion coefficient in comparison to other materials and the low elasticity of wear rings of this kind. During thermal start-up transients, such as those occurring during the pumping of hot fluids, for example, the rotor wheel heats up due to the throughflow and the smaller mass faster than the wear ring inserted in a stator part. In this connection, with steep transients, the narrow sealing gap can shrink below a permissible size or can even be by-passed, which can lead to a premature widening of the sealing gap or even to damaging of the flow machine.

SUMMARY OF THE INVENTION

An object of the present invention is to make available a flow machine for a fluid, which includes a radial sealing gap between the stator parts and a rotor and which is suitable for larger thermal start-up transients such as can occur, for example, when starting up boiler feed pumps.

This object is satisfied in accordance with embodiments of the invention by a flow machine disclosed herein.

The flow machine in accordance with the invention, which can be designed as a rotary pump, for example, and in particular as a boiler feed pump, includes a radial sealing gap between the stator parts and a rotor, wherein at least one wear ring is provided at the sealing gap. In the flow machine in accordance with the invention the wear ring is fastened to one of the stator parts via an elastically deformable fastening part. The fastening part is connected on the one side to the stator part, and on this side a radial gap is formed between an outer jacket surface of the wear ring and the fastening part and on the other side with the wear ring, with a radial gap being formed on this side between an outer jacket of the fastening part and the stator part. The fastening part is advantageously rotationally symmetrically formed and/or is provided with a closed surface at the periphery. In a preferred embodiment the fastening part has in cross-section the shape of a bending beam.

In an advantageous embodiment of the flow machine, the fastening part can be manufactured as a single part. The fastening part is advantageously connected to the stator part by means of shrink fit and/or welded connection and/or brazed connection and/or screwed connection.

In a further advantageous embodiment of the flow machine the fastening part is connected to the wear ring by means of shrink fit, and/or the wear ring is secured against displacement on the fastening part by means of screws.

In one advantageous embodiment the lengths of the radial gap between the outer jacket surface of the wear ring and the fastening part and/or the length of the radial gap between the outer jacket surface of the fastening part and the stator part are larger than the half length of the fastening part.

In a further advantageous embodiment the material of the wear ring 5 has a heat expansion coefficient $\alpha$ of less than $10 \times 10^{-6}/°$ C. and in a further preferred embodiment the wear ring comprises a wear-resistant material, for example nitride hardened cast steel, such as material no. 1.438, or a ceramic material, for example of metal oxides, tungsten carbide or silicon carbide.

The flow machine in accordance with the invention has the advantage that, due to the elastically deformable fastening part and the above-described gaps between the outer jacket surfaces of the wear ring and the fastening part and between the outer jacket surface of the fastening part and the stator part, the wear ring is movable in the radial direction. Thus thermally caused alterations of the wear ring radius are not limited by the stator part. It is further advantageous that the wear ring is thermally decoupled from the stator parts as a consequence of the heat resistance of the fastening part. By this means the wear ring can adapt faster to the temperature of the through flowing fluid, so that damage which can occur when the sealing gap between the rotor and the wear ring shrinks below a permissible measurement during steep start-up transients can be avoided. It is additionally possible to adapt the degree of thermal decoupling between the wear ring and the stator parts to the respective application by the shape of the fastening part and/or by the selection of the material of the fastening part.

The above description of embodiments serves merely as an example. Further advantageous embodiments can be seen from the drawings. Furthermore, individual features from the described or illustrated embodiments and variants can also be combined with one another within the context of the present invention, in order to form new embodiments.

BRIEF DESCRIPTION OF THE DRAWINGS

The invention will be explained more closely in the following with the help of the drawings.

DESCRIPTION OF THE PREFERRED EMBODIMENTS

Figure 1:
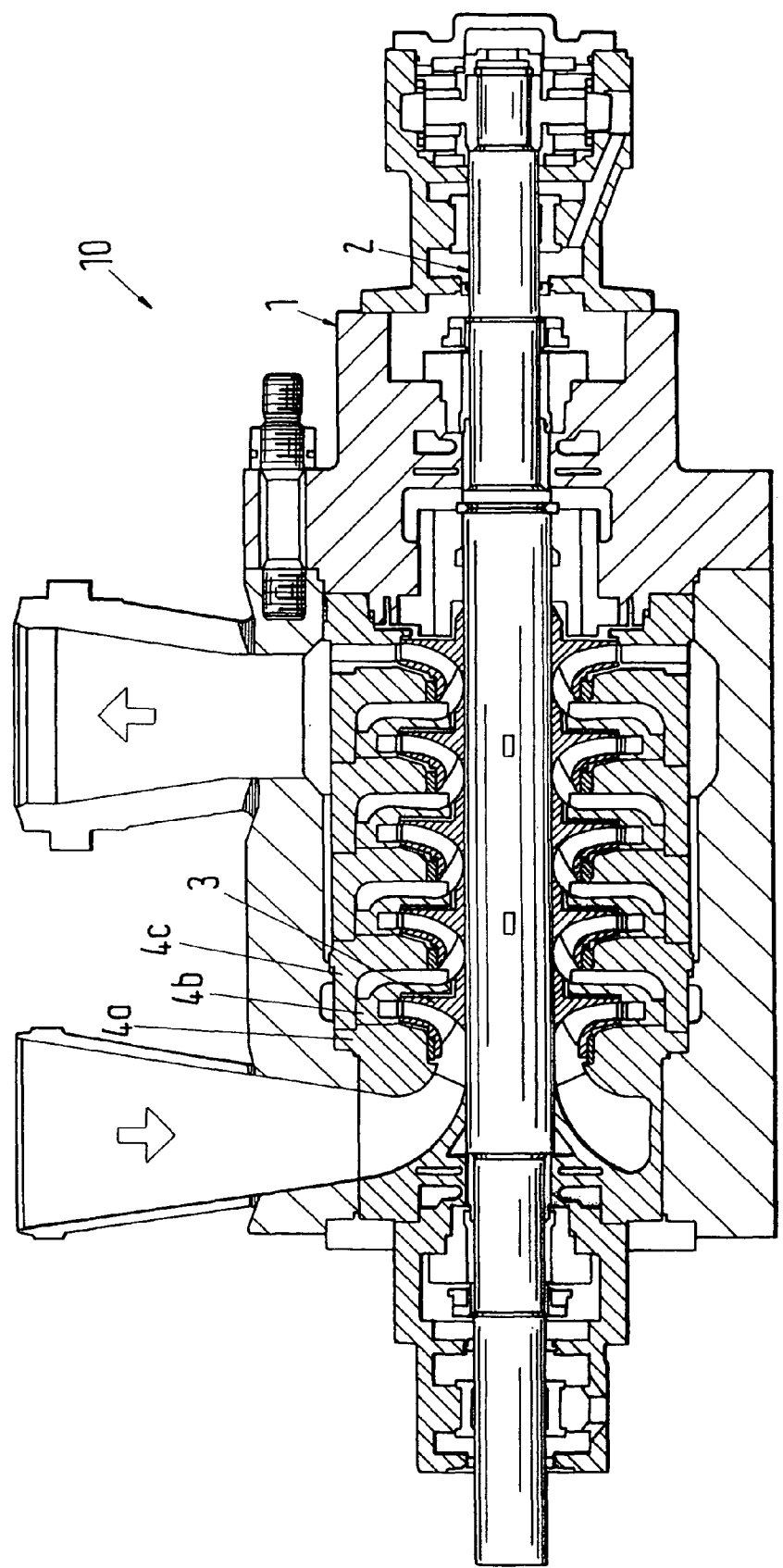
FIG. 1 is a longitudinal section through a conventional flow machine for fluids.

FIG. 1 shows a longitudinal section through a conventional flow machine for fluids, which can, for example, be designed as a multi-stage boiler feed pump for hot fluids. Stator parts 4a, b, c and a rotor 3 with a shaft 2 are provided in a housing 1 of the flow machine, the shaft 2 being rotatably mounted in the housing. The rotor can, as FIG. 1 shows, include several rotor discs, for example an induction rotor disc at the inlet of the flow machine and a plurality of succeeding rotor discs.

Figure 2:
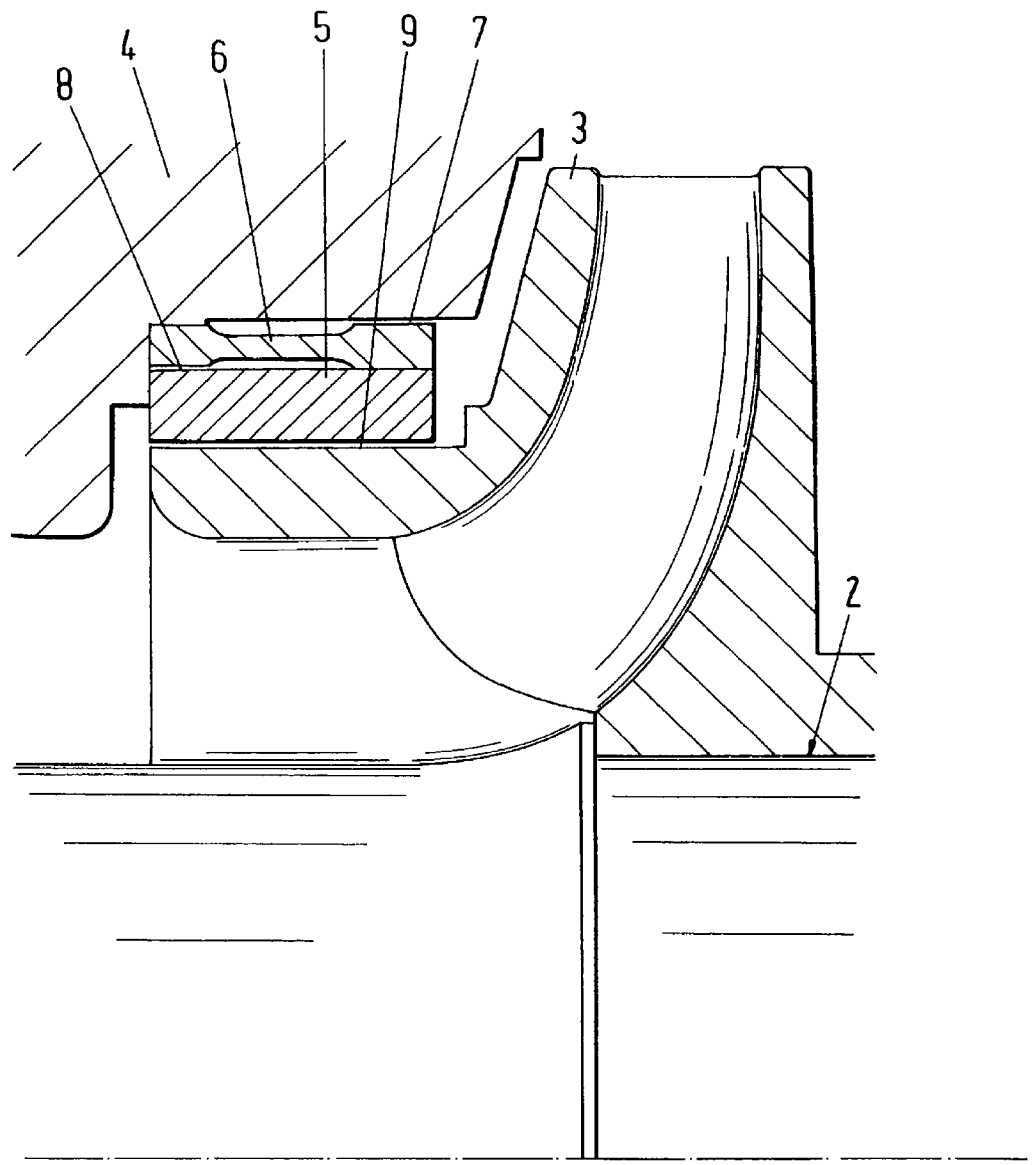
FIG. 2 is a detailed view of a specific embodiment of a flow machine in accordance with the present invention.

FIG. 2 shows a detailed view of an embodiment of a flow machine in accordance with the present invention. In the detailed view shown the reference numeral 3 designates a rotor, which is arranged on a shaft 2, with only the upper part being shown in each case in FIG. 2 and the part rotationally symmetrical with regard to the shaft axis having been omitted. The rotor 3 can, as shown, also be designed as a rotor disc, for example as a closed rotor disc, and in particular as a closed suction rotor disc for a pump.

The flow machine further includes a stator part 4, which is advantageously designed and arranged so that a flow channel is formed between the stator part 4 and the shaft 2, which opens out into a flow channel in the rotor disc 3. A radial sealing gap 9 is provided between the rotor disc 3 and the stator part 4 and is advantageously selected to be narrow, in order to keep the flow loss small. In the embodiment illustrated a wear ring 5 fastened to the stator part 4 is provided at the sealing gap 9, in order to counteract the wear and the broadening of the sealing gap associated therewith. If necessary, an abrasion-resistant protective layer can be provided on the jacket surface of the rotor which forms the sealing gap together with the wear ring 5 or, if the fluid to be conveyed contains abrasive solid materials for example, a wear ring which is fastened to the rotor.

In an advantageous embodiment the wear ring 5 is secured to the stator part 4 and, if present, the wear ring secured to the rotor is made of a wear-resistant material, for example nitride-hardened cast steel, or of a ceramic material, such as for example metal oxides, tungsten carbide or silicon carbide. In a further advantageous embodiment the material of the wear rings has a thermal expansion coefficient $\alpha$ of less than $10 \times 10^{-6}/°C$.

In the embodiment shown the wear ring 5 is fastened to the stator part 4 via an elastically deformable fastening part. The fastening part 6 is connected to the stator part at the one side. On this side a radial gap 8 is formed between an outer jacket surface of the wear ring and the fastening part. On the other side the fastening part 6 is connected to the wear ring 5, with a radial gap 7 being formed on this side between the outer jacket surface of the fastener part and the stator part.

The fastening part 6, which is advantageously made rotationally symmetrical, can for example be connected to the wear ring by means of a shrink fit. The wear ring is advantageously secured against displacement on the fastening part by means of screws. In an advantageous variant, the length of the radial gap 8, between the outer jacket surface of the wear ring and the fastening part, and/or the length of the radial gap 7 between the outer jacket surface of the fastening part and the stator part, is larger than the half length of the fastening part 6.

The characteristics of the fastening part 6, such as for example stiffness and heat resistance, can be adapted to the respective application by the shape given, for example by the choice of length, wall thickness and diameter, and if required by the selection of the material of the fastening part. In an advantageous embodiment the fastening part has the shape of a bending beam in cross-section.

Figure 3:
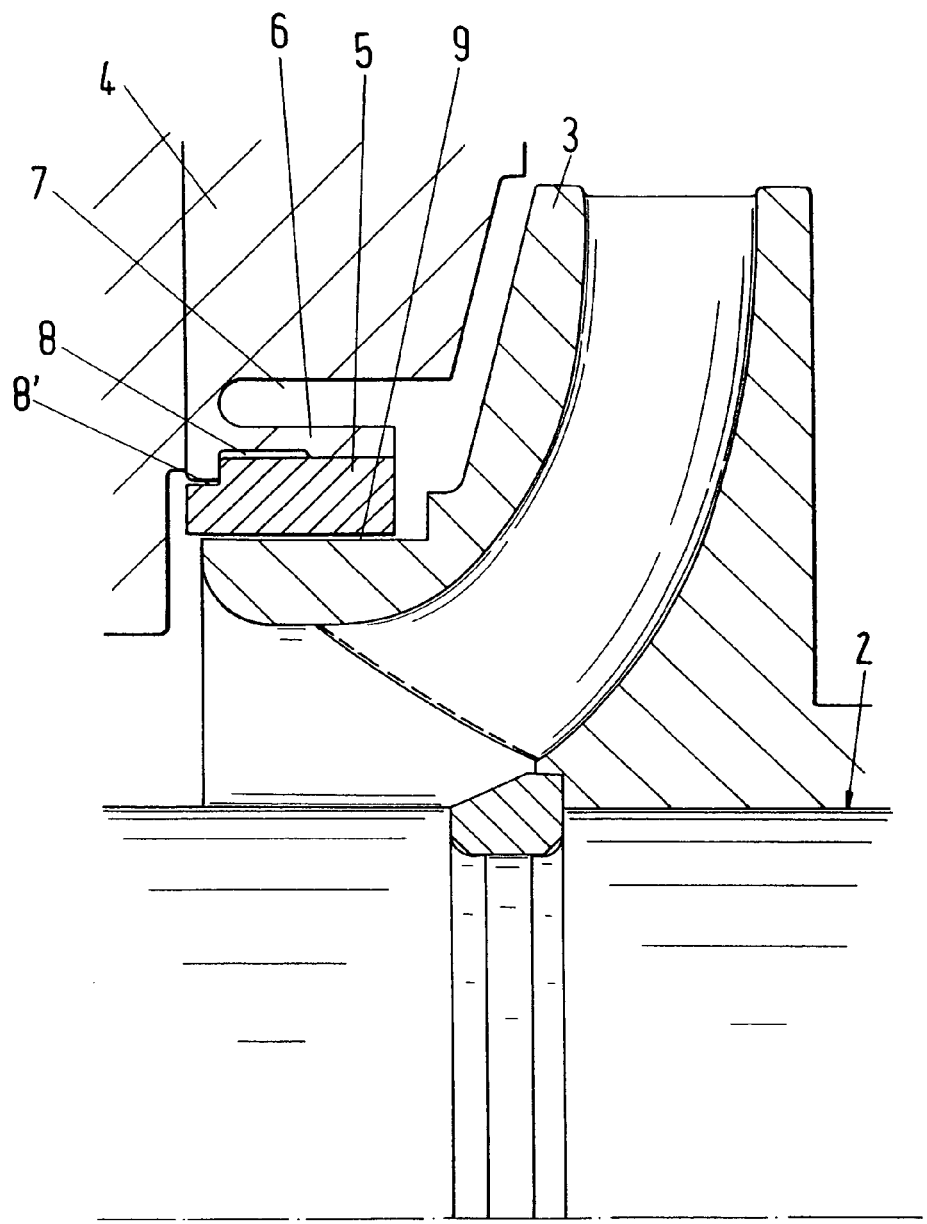
FIG. 3 is a detailed view of a second specific embodiment of a flow machine in accordance with the present invention.

FIG. 3 shows a detailed view of a second embodiment of a flow machine in accordance with the present invention. With the exception of the design of the fastening part, the features and characteristics of the second embodiment are the same as those of the first specific embodiment, so that in the following only the differences in the design of the fastening part will be discussed. In the second embodiment the flow machine includes an elastically deformable fastening part 6 which is formed as a part of the stator part 4 and which serves to fasten a wear ring 5 to a stator part 4. Thus a separate fastening of the fastening part on the stator part is avoided. On the one side of the fastening part 6, where this is connected to the remainder of the stator part 4, a radial gap 8, 8' is formed between an outer jacket surface of the wear ring and the fastening part. This gap can, as shown in FIG. 3, include two parts 8 and 8', which are connected to one another via an axial gap section. At the other side of the fastening part 6 the latter is connected to the wear ring 5 and a radial gap 7 is formed at this side between an outer jacket surface of the fastening part and the stator part. This gap can also be widened to a groove for technical manufacturing reasons.

The fastening part 6 which is expediently made rotationally symmetric can, for example, be connected to the wear ring by means of a shrink fit. The wear ring is advantageously secured against displacement on the fastening part 6 by means of screws.

In an advantageous embodiment the total length of the radial gap 8, 8' between the outer jacket surface of the wear ring and the fastening part and/or the length of the radial gap or rather of the radial groove 7 between the outer jacket surface of the fastening part and the remaining stator part are larger than half the length of the fastening part 6.

The flow machine in accordance with the invention has the advantage that a wear ring, which is provided at a sealing gap between a stator part and a rotor, can adapt more quickly to the temperature of the fluid flowing through as a result of the heat resistance and the elasticity of the fastening part, so that the situation in which the sealing gap falls below permissible values during steep start-up transients can be avoided. The flow machine in accordance with the invention makes possible a faster starting up of flow machines for hot fluids, for example, such as boiler feed pumps.

The invention claimed is:

1. A rotary pump for a fluid with a radial sealing gap between stator parts and a rotor, with at least one wear ring being provided at the sealing gap, wherein the wear ring is fastened to one of the stator parts via an elastically deformable fastening part, wherein the fastening part has two sides in an axial direction and is connected to the stator part on one side and, on this side, a radial gap is formed between an outer jacket surface of the wear ring and the fastening part, with the wear ring being moveable in the radial direction with respect to the fastening part on this side, and wherein the fastening part is connected on its other side to the wear ring, with another radial gap being formed on this other side between an outer jacket surface of the fastening part and the stator part and wherein on the axial side where the fastening part is connected to the stator part, the fastening part is not connected to the wear ring.

2. A rotary pump in accordance with claim 1, wherein the fastening part can be manufactured as a single part.

3. A rotary pump in accordance with claim 1, wherein the fastening part is made rotationally symmetrical and/or has the shape of a bending beam in cross-section.

4. A rotary pump in accordance with claim 1, wherein the fastening part is connected with the stator part by a shrink fit and/or a welded connection and/or a brazed connection and/or a screw connection.

5. A rotary pump in accordance with claim 1, wherein the fastening part is connected to the wear ring by a shrink fit and/or wherein the wear ring is secured against displacement on the fastening part by screws.

6. A rotary pump in accordance with claim 1, wherein the length of the radial gap between the outer jacket surface of the wear ring and the fastening part and/or the length of the radial gap between the outer jacket surface of the fastening part and the stator part is larger than the half length of the fastening part.

7. A rotary pump in accordance with claim 1, wherein the material of the wear ring has a thermal expansion coefficient $\alpha$ of less than $10 \times 10^{-6}/°C$.

8. A rotary pump in accordance with claim 1, wherein the wear ring comprises a wear-resistant material and/or a ceramic material, for example of metal oxides, tungsten carbide or silicon carbide.

* * * * *